Patented Mar. 12, 1940

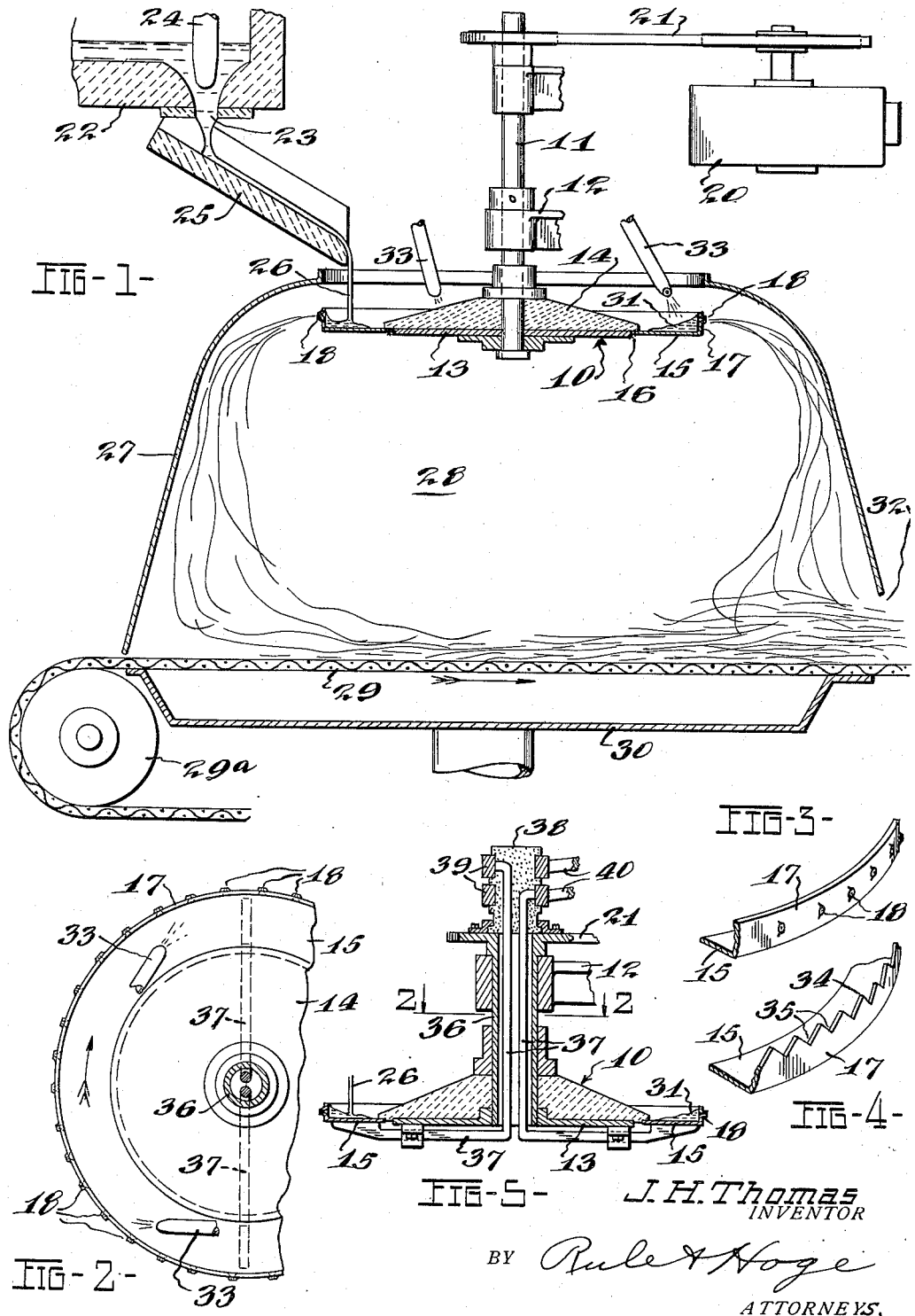

2,192,944

UNITED STATES PATENT OFFICE 2,192,944

APPARATUS FOR MANUFACTURING GLASS WOOL

John H. Thomas, Newark, Ohio, assignor, by mesne assignments, to Owens-Corning Fiberglas Corporation, a corporation of Delaware Application May 11, 1937, Serial No. 141,939

2 Claims. (Cl. 83—91)

My invention relates to the manufacture of fibrous products from materials which may assume a viscous, semi-fluid or molten condition in which the material is caused to flow in stream formation and the flowing material drawn out into the form of fine fibers. The invention provides a method adapted for use with thermoplastic materials such as solutions of metal oxides in each other. These may include solutions of metal oxides in silica, or, more broadly, a solution of metal oxides and silica in each other, including most or all kinds of glass. Other thermoplastic materials such as vinylite, resins, sugar, etc., may be employed in the manufacture of fibrous products in accordance with the present invention. The method herein disclosed is, moreover, adapted for use with viscous substances generally, such, for example, as viscose used in the manufacture of artificial silk, urea-formaldehyde products with which a plasticizer has been incorporated, etc.

The particular form of apparatus herein disclosed is adapted for use in the manufacture of glass fibers in a form commonly known in the trade as glass wool, in which the fibers are accumulated in more or less matted form. The invention comprises a novel method and an apparatus including a spinning element, preferably of annular form, which is rotated horizontally at a high speed, on which element a stream of molten glass or like material is caused to flow. The molten material is thrown by centrifugal force from the periphery of the spinner and drawn by said force into the form of fine fibers which are accumulated in matted form.

My invention is in the nature of an improvement over methods and apparatus shown in the prior art, in which molten glass or the like is caused to flow onto a horizontally rotating disk or spinner and is thrown therefrom by centrifugal force. British Patent No. 373,932 to Maatschappij, dated June 2, 1932, is an example of such an apparatus. As disclosed in this patent, the molten glass is caused to flow onto the center of a horizontally rotating disk which scatters the liquid mass into minute drops which are thrown off by the centrifugal force and simultaneously formed into thin threads.

An object of the present invention is to provide an improved method and means by which the molten glass or the like, when discharged onto the rotating element, is accumulated to a certain extent and reduced to fibrous form by projecting from the accumulated supply body, small streams of the molten material which are drawn out into long fine fibers by the centrifugal force while still integrally united with the supply body. In this manner, a product is obtained which consists of very fine fibers of great length and substantially free from slugs. Such product is quite in contrast to and much superior to that obtained by prior methods, such as that of the British patent above mentioned, wherein the fibers, being formed from minute drops or discrete particles of the material, are necessarily comparatively short in length and intermixed with a large percentage of slugs or incompletely formed fibers.

A further object of my invention, as adapted to the manufacture of glass wool, is to overcome certain objections to prior art devices relating to the material of which the spinning elements are composed. Such elements have ordinarily been made of sillimanite or other refractory material which, when used for such purpose, has only a comparatively short life. The material is rapidly eroded and worn away by the molten glass, thereby necessitating frequent renewals. An aim of the present invention is to overcome this difficulty. For the accomplishment of this and other desired objects, the spinning element may comprise an annular or ring-shaped element made of platinum, platinum alloy, or equivalent material which is highly resistant to the chemical and physical action of the molten glass thereon, so that the life thereof is increased indefinitely. My invention, moreover, provides means for maintaining such annular member and the glass thereon at a very high temperature, suited for the production of fine fibers.

A further feature of the invention consists in the arrangement whereby the molten glass or the like is caused to flow directly onto the annular member or periphery of the spinning element. In this manner, the molten material is brought more directly to the point at which it is ejected from the spinning element, permitting its high temperature to be effectively maintained and at a substantial reduction in the amount of heat required as compared with prior devices.

In glass spinning devices of the prior art, such as exemplified in the British patent above identified, it is the practice to mount the spinning element at the upper end of a vertical shaft. As a result, the glass fibers, as they are produced, are accumulated in a matted mass surrounding the shaft, so that it becomes necessary, each time such a mass accumulates, to sever and remove the ring or mat of fibrous material. The necessity for this frequent severing operation is highly objectionable. An object of the present invention is to overcome this objection, and to this end there is provided means for suspending the spinning element at the lower end of a driving shaft in such a manner that the fibrous material, as it is formed, may accumulate continuously on a traveling belt or the like, thereby forming a continuous mat and permitting production to continue indefinitely and without interruption.

A further object of the invention is to provide improved means for forming the supply body of molten glass, as it departs from the spinning element, into small streams of suitable character to be drawn out into fine fibers, thereby resulting in a uniformly fine product.

Other objects of the invention will appear hereinafter.

Referring to the accompanying drawing:

Fig. 1 is a somewhat diagrammatic sectional elevation of an apparatus adapted for use in practicing my novel method;

Fig. 2 is a fragmentary sectional plan view of the apparatus shown in Fig. 5, the section being taken at the line 2—2 on Fig. 5;

Fig. 3 is a fragmentary perspective view showing a portion of the ring or periphery of the spinning element;

Fig. 4 is a similar view of a modified construction; and

Fig. 5 is a sectional elevation showing a modified form of apparatus comprising means for electrically heating the spinning ring.

Referring particularly to Fig. 1, there is provided a spinning element 10 mounted on the lower end of a vertical shaft 11 journaled to rotate in bearings 12. The spinning element 10, as shown, comprises a disk 13 which may be made of a base metal, and a body 14 of refractory material. Surrounding the disk 13 is a ring 15 which is preferably made of a metal or metal alloy which is highly resistant to the chemical and physical action of the molten glass. I have found that platinum or a platinum-rhodium alloy is well suited for this purpose. The ring 15 may be welded as at 16 to the disk 13 or otherwise firmly secured to said disk. The ring 15 has its outer marginal portion upturned to provide a peripheral flange 17 which may be vertical, as shown, or may be more or less inclined to the vertical if so desired. The flange 17 is formed with an annular series of nipples 18 which provide small outlet openings through which molten glass is ejected, as more particularly set forth hereinafter.

The spinning element is rotated at a high speed by any suitable mechanism. For this purpose, I have shown an electric motor 20 having a driving connection with the shaft 11 by means of a belt or sprocket chain 21 running over sprocket wheels mounted, respectively, on the motor shaft and the shaft 11.

Molten glass or other molten viscous material is supplied from a tank, forebay or other container 22 provided with a bottom outlet 23 through which the molten material flows in a continuous stream, the size of the stream being regulated by a vertically adjustable plug 24 projecting into the outlet. The stream of molten glass flows into and down a trough 25. From the lower end of the trough the stream 26 flows vertically downward onto the ring 15. A hood 27 surrounds the spinner 10 and provides an enclosed chamber 28 within which the fibers are confined and accumulate. The fibers as they accumulate are deposited on a foraminous support 29 or screen which may be in the form of an endless belt or conveyor running over a roll 29ª and driven continuously by any suitable means (not shown). A suction chamber 30 is provided beneath the hood and conveyor, from which air may be continuously exhausted, thereby causing a down draft of air through the hood and conveyor. This assists in drawing and directing the fibers onto the conveyor, and matting and compacting them thereon.

The glass as it flows onto the ring 15, accumulates thereon and forms an annulation or ring 31 which serves as a supply body for the streams issuing from the nipples 18. The glass is piled up to a certain extent against the inner surface of the flange 17, owing to centrifugal force, the upper surface of the glass being thereby carried above the outlets 18, leaving the latter submerged. This permits a continuous stream of the molten glass to be projected through each said outlet. The force thus applied to the issuing fine streams of glass, operates to draw or attenuate each said stream to the form of a fine filament or fiber which, as it is exposed to the atmosphere, is quickly cooled and solidified. These fibers as they are formed, are quickly deposited on the traveling conveyor 29 and accumulate thereon in loosely matted form.

The fibrous material is thus continuously formed and accumulated in a loose, fluffy mass of fine fibers and the mat continuously advanced beyond the hood. The discharge side of the hood is cut away or spaced above the conveyor to provide an outlet 32 through which the web passes as it is formed. The fibers formed by the method just described may be of great fineness and uniformity of diameter. They may be made of any desired fineness, ranging from three or four microns in diameter upward to relatively coarse fibers where a comparatively coarse material is desired. Also, owing to the method of production, these fibers may be made of great length, or practically continuous. That is to say, each stream of molten glass issuing from an outlet or nipple 18 may be continuous and attenuated to its fibrous form without being separated from the supply body 31, so that the individual fibers may be of great length or practically continuous.

In order to maintain the molten glass at the required high temperature while supported on the ring 15, suitable heating means are provided. As shown in Fig. 1, burners 33 are positioned over the ring 15 and direct heating flames against the glass. As indicated in Fig. 2, the burners may be inclined to project their flames forward in the direction of rotation of the spinning element.

Fig. 4 shows a modified construction for dividing the supply body of glass into individual streams. As here shown, the flange 17 has its upper edge formed with teeth or projections 34. The notches 35 between said teeth provide outlets for the glass which, as it accumulates on the ring 15, is projected in stream formation through said notches.

Fig. 5 illustrates a modified construction in which provision is made for electrically heating the ring 15. In this construction, the shaft 36 which carries the spinner is made hollow. Electrical conductors 37 extend downward through the hollow shaft, and below the disk 13 are extended laterally in opposite directions and are united to the ring 15 at diametrically opposite points. An extension 38 of the shaft 36, which may be made of porcelain or other suitable material, carries a pair of conducting rings 39 to which the upper ends of the conductors 37 are connected. Brushes 40 bearing against the rings 39 are connected in circuit with any suitable source of electric current. The ring 15 is thus connected to a source of electric current by which the ring may be maintained at any desired high temperature sufficient to prevent cooling of the supply body of glass 31. If desired, the heat supplied by means of the electric current may be sufficient to raise the temperature of the molten glass. Burners 33, such as shown in Fig. 2, may be used to supplement the electric current.

Modifications may be resorted to within the spirit and scope of my invention.

I claim:

1. Apparatus for producing glass fibers, which comprises a spinner including a horizontally disposed disk of base metal, a body of refractory material overlying said disk, and a ring consisting mainly of platinum, said ring surrounding the periphery of said base metal disk and being welded thereto, means located laterally of said spinner for flowing molten glass directly onto said ring, a hollow shaft on which the spinner is mounted and extending upwardly therefrom, electrical conductors extending downwardly through said shaft and connected to said ring for conducting electric current to the ring and heating it to a high temperature, and means for rotating the spinner at a high speed about the axis of said shaft.

2. Apparatus for producing glass fibers, which comprises a spinner including a horizontally disposed disk of base metal, a body of refractory material overlying said disk, and a ring consisting mainly of platinum, said ring surrounding the periphery of said base metal disk and being welded thereto, means located laterally of said spinner for flowing molten glass directly onto said ring, a hollow shaft on which the spinner is mounted and extending upwardly therefrom, electrical conductors extending downwardly through said shaft and connected to said ring for conducting electric current to the ring and heating it to a high temperature, means for rotating the spinner at a high speed about the axis of said shaft, said ring having an upwardly extending peripheral flange formed with openings at short intervals through which the molten glass is ejected and drawn by centrifugal force to fine filaments, and means for confining and accumulating the filaments in matted form as they are produced.

JOHN H. THOMAS.